US009520971B2

(12) United States Patent
Hao et al.

(10) Patent No.: US 9,520,971 B2
(45) Date of Patent: Dec. 13, 2016

(54) DATA TRANSMISSION METHOD AND DEVICE

(75) Inventors: Peng Hao, Shenzhen (CN); Lining Yang, Shenzhen (CN); Can Huang, Shenzhen (CN); Zhen Gao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 14/415,619

(22) PCT Filed: Jul. 17, 2012

(86) PCT No.: PCT/CN2012/078757
§ 371 (c)(1),
(2), (4) Date: Jan. 19, 2015

(87) PCT Pub. No.: WO2013/166779
PCT Pub. Date: Nov. 14, 2013

(65) Prior Publication Data
US 2015/0180626 A1    Jun. 25, 2015

(51) Int. Cl.
*H04W 4/00* (2009.01)
*H04L 5/00* (2006.01)
(Continued)

(52) U.S. Cl.
CPC ............. *H04L 5/0044* (2013.01); *H04J 3/047* (2013.01); *H04J 3/1605* (2013.01)

(58) Field of Classification Search
None
See application file for complete search history.

(56) References Cited

U.S. PATENT DOCUMENTS 8,165,164 B1    4/2012 Hammer
2005/0105534 A1    5/2005 Osterling
(Continued)

FOREIGN PATENT DOCUMENTS

CN    101160925 A    4/2008
CN    101715214 A    5/2010
(Continued)

OTHER PUBLICATIONS

International Search Report for corresponding application PCT/CN2012/07857 filed Jul. 17, 2012; Mail date Apr. 25, 2013.
(Continued)

*Primary Examiner* — Edan Orgad
*Assistant Examiner* — Rebecca Song
(74) *Attorney, Agent, or Firm* — Cantor Colburn LLP

(57) ABSTRACT

Provided is a data transmission method and device. The method includes: receiving IQ data from an uplink; according to the mapping of the IQ data in a Common Public Radio Interface (CPRI) basic frame, utilizing at least one storage unit to sequence the IQ data; combining a control word with the sequenced IQ data to form CPRI data, and transmitting the CPRI data. The solution utilizes at least one storage unit to sequence the IQ data, and extracts the sequenced data for a CPRI framing operation. This solution is simple in hardware processing and low in realization complexity. The change and upgrade of the transmission bandwidth of multiple modes (single mode or mixed mode) during system upgrade only occur on software layer without affecting the realization of hardware, thus having good flexibility.

14 Claims, 3 Drawing Sheets

(51) Int. Cl.
*H04J 3/04* (2006.01)
*H04J 3/16* (2006.01)

(56) References Cited

U.S. PATENT DOCUMENTS

| 2012/0057572 A1* | 3/2012 | Evans | H04W 88/085 |
| | | | 370/338 |
| 2013/0138830 A1* | 5/2013 | Fang | H04L 47/263 |
| | | | 709/233 |

FOREIGN PATENT DOCUMENTS

| CN | 101771660 A | 7/2010 |
| EP | 2367311 A2 | 9/2011 |
| WO | 9636951 A1 | 11/1996 |

OTHER PUBLICATIONS

European Search Report for corresponding application 12 876 398.4; Report issued Jul. 8, 2015.
MSC8157 Reference Manual, Broadband Wireless Access Six Core DSP, Rev 2, Jan. 2002, XP-002698473.

\* cited by examiner

DATA TRANSMISSION METHOD AND DEVICE

TECHNICAL FIELD

The disclosure relates to the field of communications, and in particular to a data transmission method and device.

BACKGROUND

In the $3^{rd}$ generation mobile communication system, traditional macro evolved NodeBs (eNodeBs) have been replaced by distributed eNodeBs. The distributed eNodeBs are featured by separation between baseband and radio, and adopt optical fibre or cable to implement the remote function; while the baseband and radio unit of the traditional eNodeBs are integrated. Baseband Units (BBUs) of the distributed eNodeB form a shared baseband pool. The baseband and the radio frequency parts are connected by a remote transmission means, for example, the optical fibre and cable. Remote Radio Units (RRUs) are placed at any place needed. The two independent parts of the distributed eNodeB are separated from each other and are developed separately.

The BBU and the RRU are connected by the optical fibre, and an interface between them has been stipulated by standards. The current mainstream interface standards include the Common Public Radio Interface (CPRI) and the Interface between the RRU and the BBU (IR). The CPRI is used more widely, and can support the transmission under single-mode and mixed-mode of multiple modes, such as the Global System for Mobile Communication (GSM), the Universal Mobile Telecommunications System (UMTS), the Code Division Multiple Access (CDMA) and the Long-Term Evolution (LTE).

The CPRI protocol bears three types of data: orthogonal IQ data, control word and signalling, wherein the transmission formats of the control word and signalling are relatively fixed, but the transmission of the IQ data is very flexible. The CPRI protocol merely specifies that the transmission of the IQ data needs to meet the rate (3.84 Mbps) of a basic frame of the CPRI transmission, so the IQ placing formats in the CPRI frame format of different modes are different, and the IQ placing formats in the CPRI frame format of the mixed modes of different modes are different too, which causes the difference between realizations of framing and deframing of the IQ data.

As regards framing and deframing of the IQ data, most of the current implementation solutions are seeking for a relatively appropriate IQ data placing format in a basic frame of CPRI transmission, then conducting data framing and deframing processing according to features of this placing format, and the course of processing is implemented by using hardware.

However, the implementation of the above solution is high in hardware complexity; at the same time, with the development of CPRI protocol and the upgrade of system, the flexibility of this solution is limited. After the transmission bandwidth of different modes (single mode or mixed mode) changes, the IQ data placing format in a basic frame of the CPRI transmission will be influenced directly, which will lead to change of realizing way of hardware. So, how to adapt to the development of protocol and system better, and adapt to various possible IQ data placing formats becomes a key technology, and is also the main problem of improving the product vitality and the market competitiveness.

SUMMARY

The embodiments of the disclosure provide a data transmission method and device, to at least solve the problem in related technology that framing and deframing hardware of the IQ data is complicated in realization and poor in flexibility.

According to an embodiment of the disclosure, a data transmission method is provided, including: receiving orthogonal IQ data from an uplink; according to mapping of the IQ data in a Common Public Radio Interface (CPRI) basic frame, utilizing at least one storage unit to sequence the IQ data; combining a control word with the sequenced IQ data to form CPRI data, and transmitting the CPRI data.

In an example embodiment, according to the mapping of the IQ data in the CPRI basic frame, utilizing the at least one storage unit to sequence the IQ data comprises: sampling the IQ data; according to the mapping of the IQ data in the CPRI basic frame, respectively extracting each bit in the sampled IQ data of one clock cycle; respectively storing the each bit in different storage units; and instructing hardware to read in one clock cycle all bits of a same carrier from the different storage units to form carrier data.

In an example embodiment, instructing the hardware to read in one clock cycle all the bits of the same carrier from the different storage units to form the carrier data comprises: instructing, through a register, the hardware to read in one clock cycle all the bits of the same carrier from the different storage units to form the carrier data.

In an example embodiment, the at least one storage unit is Radom Access Memory (RAM).

According to another embodiment of the disclosure, a data transmission device is provided, comprising: a receiving module, which is configured to receive orthogonal IQ data from an uplink; a sequencing module, which is configured to, according to mapping of the IQ data in a Common Public Radio Interface (CPRI) basic frame, utilize at least one storage unit to sequence the IQ data; a combining module, which is configured to combine a control word with the sequenced IQ data to form CPRI data; and a transmitting module, which is configured to transmit the CPRI data.

According to still another embodiment of the disclosure, a data transmission method is provided, comprising: receiving Common Public Radio Interface (CPRI) data, and separating a control word in the CPRI data from orthogonal IQ data; constructing information which is the same as mapping of the IQ data in a CPRI basic frame, and utilizing at least one storage unit to sequence the IQ data; and transmitting the sequenced IQ data.

In an example embodiment, constructing the information which is the same as the mapping of the IQ data in the CPRI basic frame comprises: constructing, according to a current mode and bit width, the information which is the same as the mapping of the IQ data in the CPRI basic frame.

In an example embodiment, utilizing the at least one storage unit to sequence the IQ data comprises: sampling the IQ data; instructing hardware to respectively extract each bit in the sampled IQ data of one clock cycle; respectively writing each bit in different storage units; and reading in one clock cycle all bits of a same carrier from the different storage units, and combining all the bits to form carrier data.

In an example embodiment, reading all the bits of the same carrier from the different storage units comprises:

instructing, through a register, the hardware to read in one clock cycle all the bits of the same carrier from the different storage units.

In an example embodiment, the at least one storage unit is Radom Access Memory (RAM).

According to still another embodiment of the disclosure, a data transmission device is provided, comprising: a receiving module, which is configured to receive Common Public Radio Interface (CPRI) data; a separating module, which is configured to separate a control word in the CPRI data from orthogonal IQ data; a constructing module, which is configured to construct information which is the same as mapping of the IQ data in a CPRI basic frame; a sequencing module, which is configured to utilize at least one storage unit to sequence the IQ data; and a transmitting module, which is configured to transmit the sequenced IQ data.

The embodiments of the disclosure utilize at least one storage unit to sequence the IQ data, and extract the sequenced data for a CPRI framing operation. The solution is simple in hardware processing and low in realization complexity. The change and upgrade of the transmission bandwidth of multiple modes (single mode or mixed mode) during system upgrade only occur on software layer without affecting the realization of hardware, thus having good flexibility.

BRIEF DESCRIPTION OF THE DRAWINGS

The accompanying drawings described here are used for providing a deeper understanding of the disclosure, and constitute a part of the application; schematic embodiments of the disclosure and description thereof are used for illustrating the disclosure and not intended to form improper limit to the disclosure. In the accompanying drawings.

DETAILED DESCRIPTION OF THE EMBODIMENTS

Note that, embodiments and features in embodiments in the application can be combined with each other on condition of not conflicting. The disclosure is elaborated below with reference to the accompanying drawings and in combination with embodiments.

At present, a variety of modes coexist in wireless products. Because of the differences in the working modes, bandwidth and optical interface rates, the IQ data placing formats in the CPRI frame are different. In order to adapt to the above differences, the versatility, flexibility and design complexity of the IQ data framing and deframing in the CPRI needs to be further considered.

Figure 1:
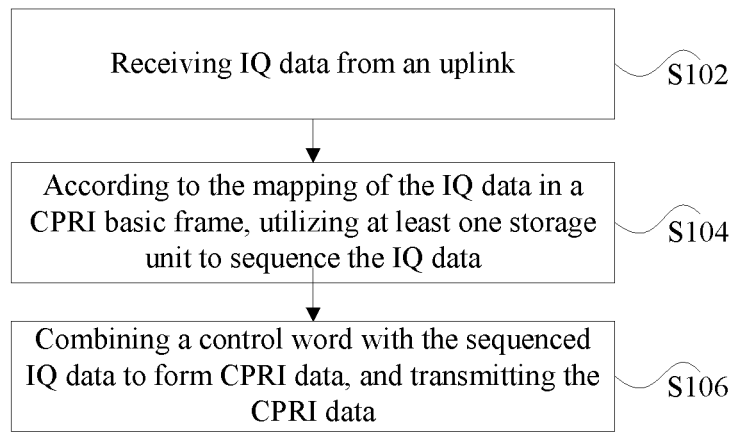
FIG. 1 is a first flowchart of a data transmission method according to an embodiment of the disclosure.

An embodiment of the disclosure provides a data transmission method which is applied to a framing process of the IQ data. FIG. 1 is a first flowchart of the data transmission method according to an embodiment of the disclosure. As shown in FIG. 1, the data transmission method includes Step 102 to Step 106 as follows.

Step 102: IQ data is received from an uplink.

Step 104: According to the mapping of the IQ data in a CPRI basic frame, at least one storage unit is utilized to sequence the IQ data.

Step 106: A control word is combined with the sequenced IQ data to form CPRI data, and the CPRI data is transmitted.

In related technology, the hardware for conducting framing and deframing of the IQ data is complicated in realization and poor in flexibility. In an embodiment of the disclosure, at least one storage unit is utilized to sequence the IQ data, and then the sequenced data is extracted for a CPRI framing operation. The solution provided by this embodiment is simple in hardware processing, and low in realization complexity. The change and upgrade of the transmission bandwidth of multiple modes (single mode or mixed mode) during system upgrade only occur on software layer without affecting the realization of hardware, thus having good flexibility.

Step 104 may include the following steps: sampling the IQ data; according to the mapping of the IQ data in the CPRI basic frame, respectively extracting each bit in the sampled IQ data of one clock cycle; respectively storing the each bit in different storage units; and instructing the hardware to read in one clock cycle all bits of the same carrier from the different storage units to form carrier data. By virtue of this manner, it is ensured to read in one clock cycle all bits of the same carrier, so that these bits can form the carrier data for further transmission.

In an example embodiment, instructing the hardware to read in one clock cycle all bits of the same carrier from the different storage units to form carrier data may include: instructing, through a register, the hardware to read in one clock cycle all bits of the same carrier from the different storage units to form carrier data.

In an example embodiment, the at least one storage unit may be RAM.

Figure 2:
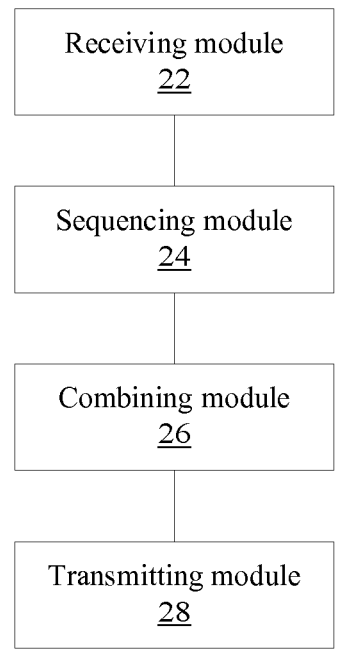
FIG. 2 is a first structural diagram of a data transmission device according to an embodiment of the disclosure.

Corresponding to the data transmission method (applied in framing), another embodiment of the disclosure also provides a data transmission device. FIG. 2 is a first structural diagram of the data transmission device according to an embodiment of the disclosure. As shown in FIG. 2, the data transmission device includes a receiving module 22, a sequencing module 24, a combining module 26 and a transmitting module 28. The structure is elaborated below.

The receiving module 22 is configured to receive orthogonal IQ data from an uplink; the sequencing module 24 is coupled with the receiving module 22 and configured to, according to the mapping of the IQ data in the CPRI basic frame, utilize at least one storage unit to sequence the IQ data; the combining module 26 is coupled with the sequencing module 24 and configured to combine a control word with the sequenced IQ data to form CPRI data; and the transmitting module 28 is coupled with the combining module 26 and configured to transmit the CPRI data.

The sequencing module 24 includes: a sampling unit, which is configured to sample the IQ data; an extracting unit, which is coupled with the sampling unit and configured to, according to the mapping of the IQ data in the CPRI basic frame, respectively extract each bit in the sampled IQ data of one clock cycle; a storage unit, which is coupled with the extracting unit and configured to respectively store the each bit in different storage units; and an instructing unit, which is coupled with the at least one storage unit and configured to instruct the hardware to read in one clock cycle all bits of the same carrier from the different storage units to form carrier data.

In an example embodiment, the instructing unit may instruct, through a register, the hardware to read in one clock cycle all bits of the same carrier from the different storage units to form carrier data.

In an example embodiment, the at least one storage unit may be RAM.

Figure 3:
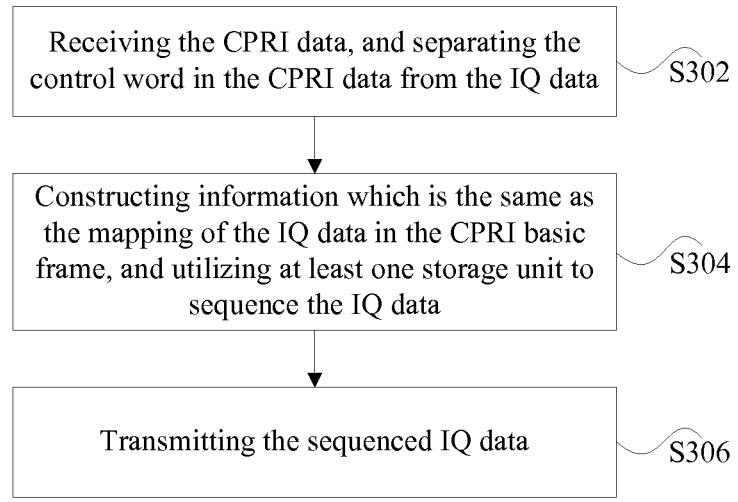
FIG. 3 is a second flowchart of a data transmission method according to an embodiment of the disclosure.

Another embodiment of the disclosure also provides a data transmission method which is applied to a deframing process of the IQ data. FIG. 3 is a second flowchart of the data transmission method according to an embodiment of the disclosure. As shown in FIG. 3, the data transmission method includes Step 302 to Step 306 as follows.

Step 302: CPRI data is received, and a control word in the CPRI data is separated from the IQ data.

Step 304: information which is the same as the mapping of the IQ data in the CPRI basic frame is constructed, and at least one storage unit is utilized to sequence the IQ data.

Step 306: the sequenced IQ data is transmitted.

In related technology, the hardware for conducting the framing and deframing of the IQ data is complicated in realization and poor in flexibility. In an embodiment of the disclosure, at least one storage unit is utilized to sequence the IQ data, and then the sequenced IQ data is sent. The solution provided by this embodiment is simple in hardware processing, and low in realization complexity. The change and upgrade of the transmission bandwidth of multiple modes (single mode or mixed mode) during system upgrade only occur on software layer without affecting the realization of hardware, thus having good flexibility.

In an example embodiment, constructing information which is the same as the mapping of the IQ data in the CPRI basic frame may include: constructing, according to the current mode and bit width, information which is the same as the mapping of the IQ data in the CPRI basic frame.

Step 304 may include the following steps: sampling the IQ data; instructing hardware to respectively extract each bit in the sampled IQ data of one clock cycle; respectively writing each bit in different storage units; reading in one clock cycle all bits of the same carrier from the different storage units, and combining all the bits to form carrier data.

In an example embodiment, reading all bits of the same carrier from the different storage units may include: instructing, through a register, the hardware to read in one clock cycle all bits of the same carrier from the different storage units.

In an example embodiment, the at least one storage unit may be RAM.

Figure 4:
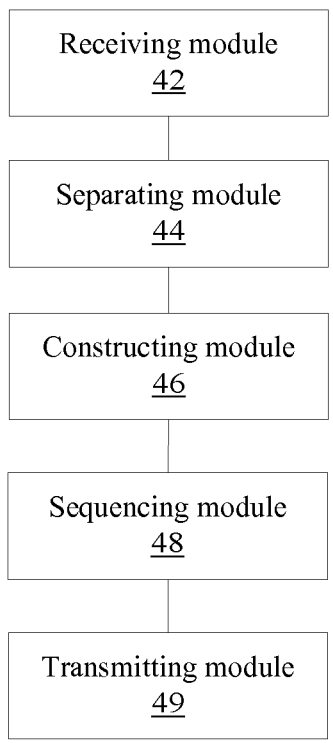
FIG. 4 is a second structural diagram of a data transmission device according to an embodiment of the disclosure.

Corresponding to the data transmission method (applied in deframing), another embodiment of the disclosure also provides a data transmission device. FIG. 4 is a second structural diagram of the data transmission device according to an embodiment of the disclosure. As shown in FIG. 4, the data transmission device includes a receiving module 42, a separating module 44, a constructing module 46, a sequencing module 48 and a transmitting module 49. The structure is elaborated below.

The receiving module 42 is configured to receive the CPRI data; the separating module 44 is coupled with the receiving module 42 and configured to separate the control word in the CPRI data from the IQ data; the constructing module 46 is coupled with the separating module 44 and configured to construct information which is the same as the mapping of the IQ data in the CPRI basic frame; the sequencing module 48 is coupled with the constructing module 46 and configured to utilize at least one storage unit to sequence the IQ data; and the transmitting module 49 is coupled with the sequencing module 48 and configured to transmit the sequenced IQ data.

In an example embodiment, the constructing module 46 may construct, according to the current mode and bit width, the information which is the same as the mapping of the IQ data in the CPRI basic frame.

The sequencing module 48 includes: a sampling unit, which is configured to sample the IQ data; an instructing unit, which is coupled with the sampling unit and configured to instruct the hardware to respectively extract each bit in the sampled IQ data of one clock cycle; a writing unit, which is coupled with the instructing unit and configured to respectively write each bit in different storage units; a reading unit, which is coupled with the writing unit and configured to read in one clock cycle all bits of the same carrier from the different storage units; and a combining unit, which is coupled with the reading unit and configured to combine all the bits to form carrier data.

In an example embodiment, reading all bits of the same carrier from the different storage units may include: instructing, through a register, the hardware to read in one clock cycle all bits of the same carrier from the different storage units.

In an example embodiment, the at least one storage unit may be RAM.

To sum up, software in the disclosure may acquire a table about the IQ data placement in the CPRI frame formats of various modes (including mixed mode), bit widths and optical interface rates in advance. The bits of the same carrier (during deframing) and the bits required to be output (during framing) in one clock cycle are to be stored in different RAMs instead of different addresses of a certain RAM.

The above embodiment enables the CPRI interface to bear the IQ data to be transmitted without being limited by mode and the IQ data placement. The above embodiment provides a flow of realizing CPRI framing and deframing based on the cooperation of software and hardware, and this is a solution in which the software dominates CPRI framing and deframing and the minimum granularity is a single bit. According to the placing formats in the CPRI frame format of different modes, bandwidths and optical interface rates, the software stores each bit in the IQ data in the at least one storage unit by configuring a register; by configuring a register through the software as well, different bits are extracted from the at least one storage unit to form a group of IQ data for further deframing and outputting or CPRI framing operation.

In order to make the technical solution and the realizing method of the embodiments of the disclosure more clear, the implementation process is elaborated below in combination with the example embodiments.

Based on the above description, realizing IQ data framing and deframing of the CPRI based on the cooperation of software and hardware in the embodiments of the disclosure mainly includes two flows: downlink deframing flow and uplink framing flow. The two flows are separately described below in combination with the example embodiments.

(1) Downlink Deframing Flow

Figure 5:
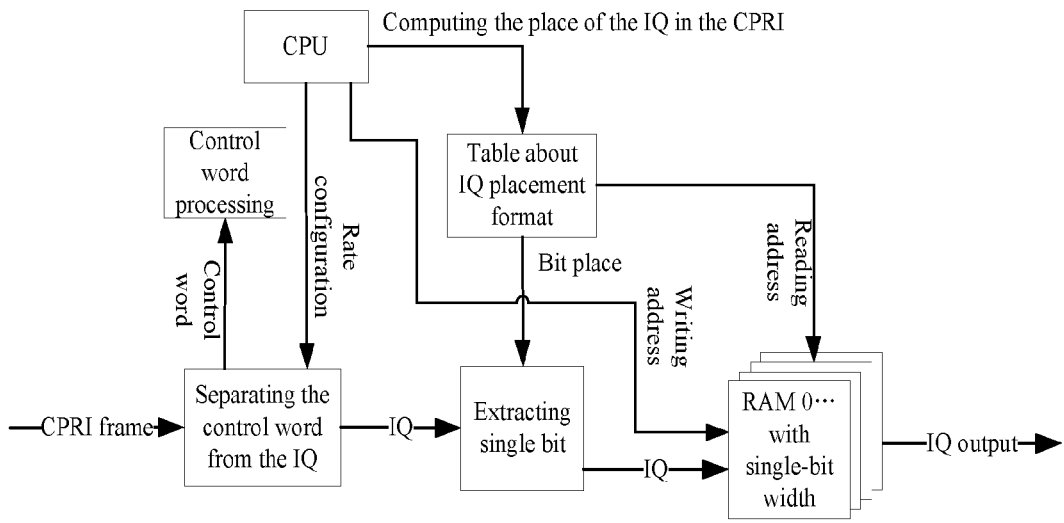
FIG. 5 is a flowchart of downlink deframing according to an example embodiment of the disclosure.

The downlink deframing flow is a process of parsing the data of CPRI frame format received from the optical fibre to obtain the needed IQ data. The specific processing flow is shown in FIG. 5.

The first step: according to CPRI rate information configured by the software, the control word and the IQ data are separated.

The second step: the software constructs, according to the current mode and bit width, a table with the same IQ data placement as the CPRI frame format; at the same time, carrier information of each bit of the IQ data is acquired; the software informs, according to the table, the hardware to respectively extract each bit in the sampled IQ data of one clock cycle.

The third step: each extracted bit of different carriers is stored in different RAMs (storage units) or a certain unit of an RAM. Note that, there is a key limit during storing in the current example embodiment that the different bits of the same carrier are to be stored in different RAMs instead of different addresses of a certain RAM, so as to ensure all the bits of the same carrier can be read out within one clock cycle.

The fourth step: information stored by the hardware is informed by the software, so the software knows related storage information for each bit of the IQ data well, then the software is able to inform, through the register, the hardware to read the bits of the same carrier out from addresses of different RAMs and combine the read bits into an effective carrier data to output. The deframing processing flow is ended.

In the above processing flow, the software controls, through the table about the IQ data placement in the CPRI frame format, the hardware to write each bit of the IQ data in the specified RAM unit, and read the bit out from the RAM unit according to the requirement of software configuration. The software needs to acquire format information of the IQ data placement in the CPRI frame format. Even though this information may be influenced by factors like optical interface rate, mode and system transmission bandwidth, the factors are fixed in a fixed application scenario, so the format information of the IQ data placement in the CPRI frame format can be acquired through transmitting software of signalling before the system is powered on or when the system is started to be powered on.

In addition, because the transmission is performed based on the CPRI basic frame format, the information acquired by the software is the IQ data placement format in a basic frame; the size of a basic frame is determined by the optical interface rate, so it is needed to meet the maximum optical interface rate supported by the system.

For the hardware, the core component is multiple RAMs with single-bit width and related storage control circuits. The data size of the RAMs with single-bit width needs to be capable of storing the data of at least one CPRI basic frame, therefore, the number of the RAMs with single-bit width is the number of bits in the data of one sampling, and the depth of the RAMs with single-bit width is the number of sampling points included in one basic frame at a certain rate, which is the equivalent of a mapping on the hardware of the IQ data placement format in the software. So, the resources of the RAMs with single-bit width depend on the maximum optical fibre rate supported by the system. Note that, the RAMs with multiple-bit width can also realize the above solution by only reading out all the bits of the same carrier within one clock cycle, but it is relatively complicated to apply the RAMs with multiple-bit width to the above flow.

(2) Uplink Framing Flow

Figure 6:
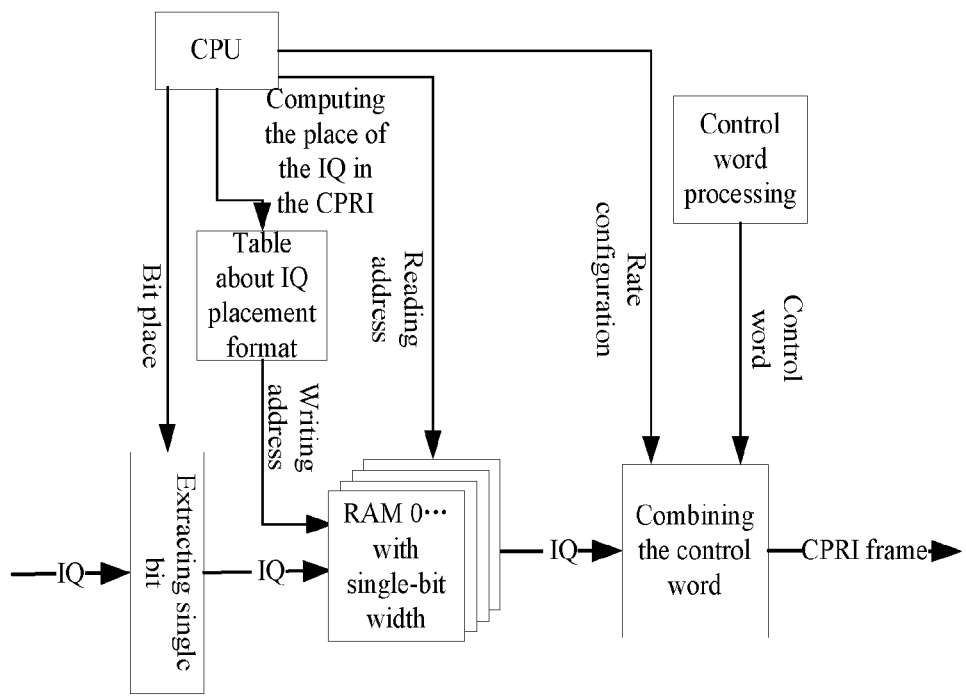
FIG. 6 is a flowchart of uplink framing according to an example embodiment of the disclosure.

The uplink framing flow is an inverse process of the downlink deframing flow. The process includes: receiving the IQ data from the uplink, sequencing the IQ data according to the CPRI frame format, and combining the control word with the IQ data according to the current optical interface rate and then transmitting the combined data; its processing flow is shown in FIG. 6.

The first step: each bit of the IQ data, which is input from the uplink, of each clock cycle belongs to the same carrier; the software respectively extracts, according to the IQ data placement in the CPRI frame format, each bit in the sampled IQ data of one clock cycle.

The second step: each extracted bit of different carriers is stored in different RAMs or a certain unit of the RAM. Note that, there is a key limit during storing in the current example embodiment that the different bits belonging to the same A×C (antenna carrier) of the CPRI are to be stored in different RAMs instead of different addresses of a certain RAM. Through the control of storage, the mapping of the IQ data, which is input from the uplink, to a CPRI basic frame is completed.

The third step: the information stored by the hardware is informed by the software, so the software knows related storage information for each bit of the IQ data well, then the software is able to inform, through the register, the hardware to read the bits of a clock cycle out from addresses of different RAMs and combine the read bits into an effective A×C data of CPRI to output.

The fourth step: according to CPRI rate information of software configuration, the control word and the IQ data are combined to form the CPRI frame format and the CPRI frame formed is output. The framing processing flow is ended.

In the above framing processing flow, all the key information is from software configuration, and the key technology is the same as that in the deframing processing. The software controls, through the table about the IQ data placement in the CPRI frame format, the hardware to write each bit in the IQ data in the specified RAM unit and read the bit out from the RAM unit according to the requirement of software configuration. For the hardware, the core component is multiple RAMs with single-bit width and related storage control circuits. The number and depth of the RAMs with single-bit width are the same as that described in the deframing processing.

Note that, these steps presented in the flowchart of the accompanying drawings can be executed in a computer system like a group of machine-executable instructions; besides, although a logical sequence is shown in the flowchart, in some cases, the presented or described steps can be executed in an order different from that described here.

To sum up, according to the above embodiments of the disclosure, a data transmission method and device are provided. After the maximum rate of the CPRI is determined, there is no limit to placement in the CPRI frame format of the IQ data, therefore, this solution has a good generality. This solution is simple in hardware processing and low in realization complexity. The change and upgrade of the transmission bandwidth of multiple modes (single mode or mixed mode) during system upgrade only occur on software layer without affecting the realization of hardware, thus having good flexibility.

Obviously, the skilled personnel in the field should appreciate that above-mentioned modules and steps of the disclosure can be realized by a general-purpose computing device, and they can be centralized in a single computing device or distributed on a network composed of multiple computing devices; optionally, they can be realized by program code which is capable of being executed by the computing device, so that they can be stored in a storage device and executed by the computing device, or they are made into integrated circuit modules, respectively; or multiple modules and steps of them are made into a single integrated circuit module to realize. In this way, the disclosure is not limited to any particular combination of hardware and software.

The above is only the example embodiment of the disclosure and not intended to limit the disclosure; for the skilled personnel in the field, the disclosure may have various modifications and changes. Any modifications, equivalent replacements, improvements and the like within the principle of the disclosure shall fall within the scope of the claims of the disclosure.

What is claimed is:

1. A data transmission method, comprising:
receiving orthogonal in-phase and quadrature (IQ) data from an uplink;
according to mapping of the IQ data in a Common Public Radio Interface (CPRI) basic frame, utilizing at least one storage unit to sequence the IQ data;
combining a control word with the sequenced IQ data to form CPRI data, and transmitting the CPRI data;
wherein according to the mapping of the IQ data in the CPRI basic frame, utilizing the at least one storage unit to sequence the IQ data comprises: sampling the IQ data; according to the mapping of the IQ data in the CPRI basic frame, respectively extracting each bit in the sampled IQ data of one clock cycle; respectively storing the each bit in different storage units; and instructing hardware to read in one clock cycle all bits of a same carrier from the different storage units to form carrier data.

2. The method according to claim 1, wherein instructing the hardware to read in one clock cycle all the bits of the same carrier from the different storage units to form the carrier data comprises:
instructing, through a register, the hardware to read in one clock cycle all the bits of the same carrier from the different storage units to form the carrier data.

3. The method according to claim 2, wherein the at least one storage unit is Radom Access Memory (RAM).

4. The method according to claim 1, wherein the at least one storage unit is Radom Access Memory (RAM).

5. The method according to claim 1, wherein the at least one storage unit is Radom Access Memory (RAM).

6. A base station, comprising a processor configured to execute program modules stored on a memory, the program modules comprising:
a receiving module, which is configured to receive orthogonal in-phase and quadrature (IQ) data from an uplink;
a sequencing module, which is configured to, according to mapping of the IQ data in a Common Public Radio Interface (CPRI) basic frame, utilize at least one storage unit to sequence the IQ data;
a combining module, which is configured to combine a control word with the sequenced IQ data to form CPRI data; and
a transmitting module, which is configured to transmit the CPRI data;
wherein the sequencing module includes: a sampling unit, which is configured to sample the IQ data; an extracting unit, which is coupled with the sampling unit and configured to, according to the mapping of the IQ data in the CPRI basic frame, respectively extract each bit in the sampled IQ data of one clock cycle; a storage unit, which is coupled with the extracting unit and configured to respectively store the each bit in different storage units; and an instructing unit, which is coupled with the at least one storage unit and configured to instruct the hardware to read in one clock cycle all bits of the same carrier from the different storage units to form carrier data.

7. A data transmission method, comprising:
receiving Common Public Radio Interface (CPRI) data, and separating a control word in the CPRI data from orthogonal in-phase and quadrature (IQ) data;
constructing information which is the same as mapping of the IQ data in a CPRI basic frame, and utilizing at least one storage unit to sequence the IQ data; and
transmitting the sequenced IQ data;
wherein utilizing the at least one storage unit to sequence the IQ data comprises: sampling the IQ data instructing hardware to respectively extract each bit in the sampled IQ data of one clock cycle; respectively writing each bit in different storage units; and reading in one clock cycle all bits of a same carrier from the different storage units, and combining all the bits to form carrier data.

8. The method according to claim 7, wherein constructing the information which is the same as the mapping of the IQ data in the CPRI basic frame comprises: constructing, according to a current mode and bit width, the information which is the same as the mapping of the IQ data in the CPRI basic frame.

9. The method according to claim 8, wherein the at least one storage unit is Radom Access Memory (RAM).

10. The method according to claim 7, wherein reading all the bits of the same carrier from the different storage units comprises:
instructing, through a register, the hardware to read in one clock cycle all the bits of the same carrier from the different storage units.

11. The method according to claim 10, wherein the at least one storage unit is Radom Access Memory (RAM).

12. The method according to claim 7, wherein the at least one storage unit is Radom Access Memory (RAM).

13. The method according to claim 5, wherein the at least one storage unit is Radom Access Memory (RAM).

14. A base station, comprising a processor configured to execute program modules stored on a memory, the program modules comprising:
a receiving module, which is configured to receive Common Public Radio Interface (CPRI) data;
a separating module, which is configured to separate a control word in the CPRI data from orthogonal in-phase and quadrature (IQ) data;
a constructing module, which is configured to construct information which is the same as mapping of the IQ data in a CPRI basic frame;
a sequencing module, which is configured to utilize at least one storage unit to sequence the IQ data; and
a transmitting module, which is configured to transmit the sequenced IQ data;
wherein the sequencing module includes: a sampling unit, which is configured to sample the IQ data; an extracting unit, which is coupled with the sampling unit and configured to, according to the mapping of the IQ data in the CPRI basic frame, respectively extract each bit in the sampled IQ data of one clock cycle; a storage unit, which is coupled with the extracting unit and configured to respectively store the each bit in different storage units; and an instructing unit, which is coupled with the at least one storage unit and configured to instruct the hardware to read in one clock cycle all bits of the same carrier from the different storage units to form carrier data.

* * * * *